Figure 1:
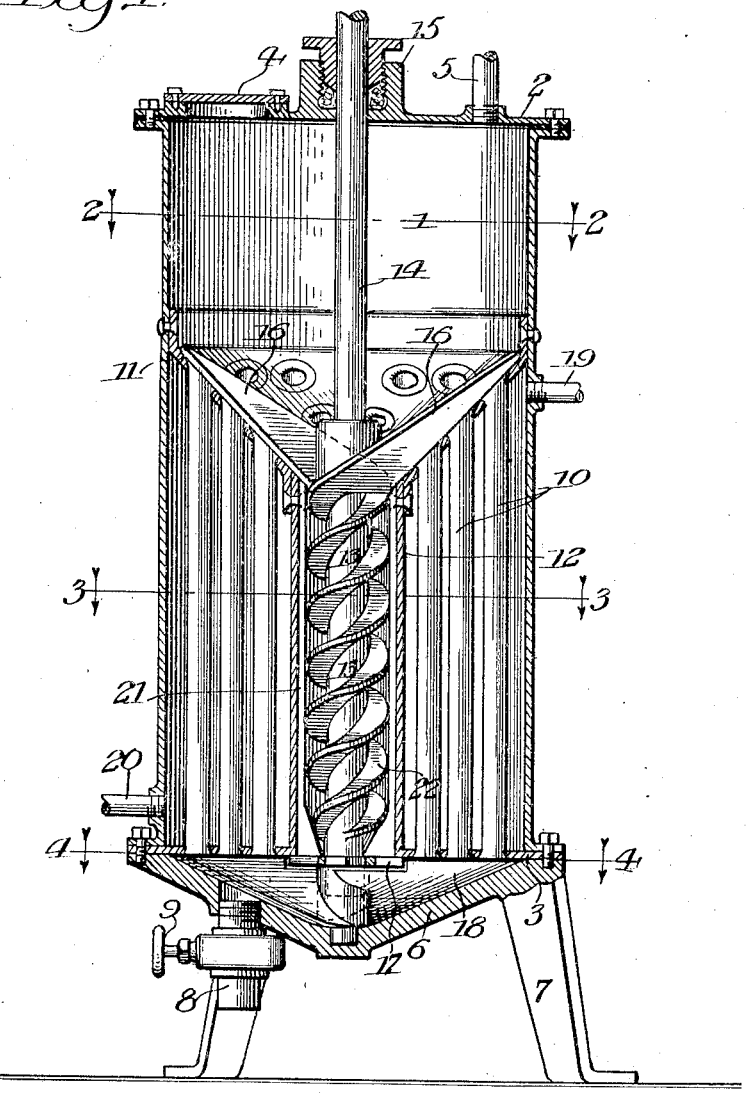

J. G. GOODHUE AND P. B. SADTLER.
APPARATUS FOR TREATING FOOD MATERIALS AND OTHER ARTICLES.
APPLICATION FILED OCT. 9, 1916.

1,358,309.

Patented Nov. 9, 1920.
2 SHEETS—SHEET 1.

Inventors
Julian G. Goodhue
Philip B. Sadtler
by
A. Miller Delfield atty.

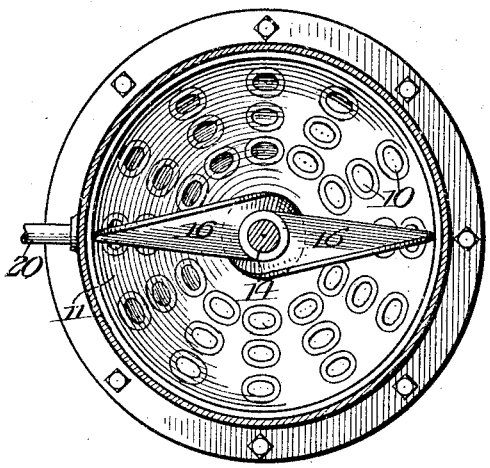
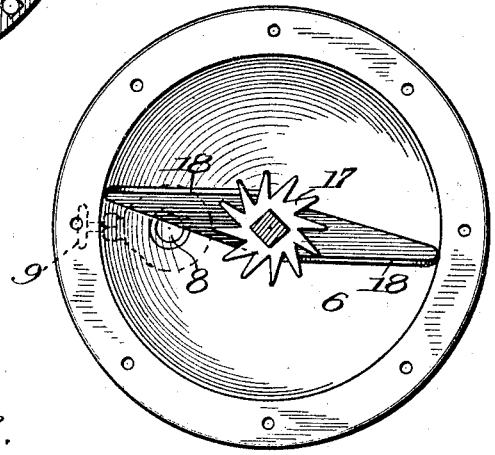
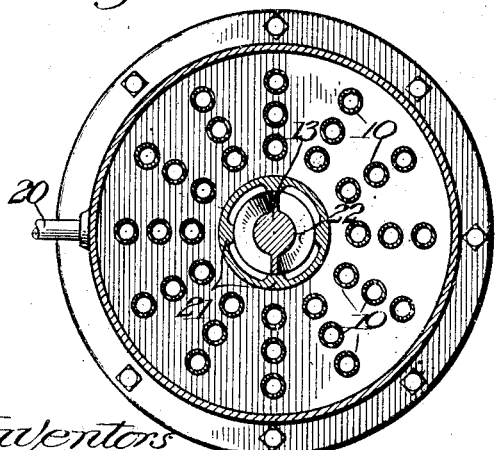

UNITED STATES PATENT OFFICE.

JULIAN G. GOODHUE AND PHILIP B. SADTLER, OF CHICAGO, ILLINOIS; SAID SADTLER ASSIGNOR TO SAID GOODHUE.

APPARATUS FOR TREATING FOOD MATERIALS AND OTHER ARTICLES.

1,358,309.        Specification of Letters Patent.        Patented Nov. 9, 1920.

Application filed October 9, 1916. Serial No. 124,749.

*To all whom it may concern:*

Be it known that we, JULIAN G. GOODHUE and PHILIP B. SADTLER, citizens of the United States, residing at Chicago, in the county of Cook and State of Illinois, have invented a certain new and useful Improvement in Apparatus for Treating Food Materials and other Articles, of which the following is a full, clear, concise, and exact description, reference being had to the accompanying drawings, forming a part of this specification.

Our invention relates to apparatus for treating food materials and other articles, and especially to a form of apparatus in which the material is reduced, heated and subjected to the influence of a vacuum.

The principal object of the invention is to provide a simple and effective apparatus of the class specified. Other objects are to reduce the cost of manufacture and operation, increase the efficiency and obtain greater simplicity.

In the accompanying drawings Figure 1 is a vertical section of an apparatus embodying our present invention;

Figs. 2, 3 and 4 are cross sections taken on lines 2—2, 3—3, and 4—4, respectively, in Fig. 1.

Referring to the drawings the apparatus shown comprises an exterior casing 1 which is preferably of cylindric form and provided with a removable top 2 and a bottom 3. The top 2 is provided with a man-hole 4 by which the material to be treated may be introduced within the casing 1. A pipe 5 is also shown connected with the top 2, this pipe being extended to an apparatus for producing a vacuum, such for example as a condenser and vacuum pump. A base member 6 is secured to the lower end of the casing and provided with supporting legs 7. An outlet 8 is secured to the base member 6 and provided with a valve 9 by which the outlet of the material after treatment may be controlled. This valve 9 is understood to be normally closed so as to prevent the escape of the material. A series of longitudinally extending pipes or tubes 10 is arranged within the casing 1 extending upwardly from the bottom thereof to a point possibly one-third more or less of the length of the casing from the top. The upper ends of these pipes 10 are supported by a partition or plate 11 preferably made conical in form and pointing downwardly, as best shown in Fig. 1. The lower ends of the pipes 10 are secured in the bottom 3. The pipes 10 are arranged in annular order around a central tubular member 12 whose upper end is connected with the lower and central portion of the plate 11 and whose lower end is secured to the bottom 3, being preferably made integral therewith. Within the tubular member 12 is a rotary screw 13 whose lower end extends down to and is rotatably supported by the member 6 and whose upper end is attached to a rotary shaft 14, which extends up through a stuffing box 15 in the top 2. At the upper end of the screw 13 there are secured a plurality, as for example two, rotary scraping members 16, which are so constructed that they contact throughout substantially their entire length with the upper surface of the holding plate 11. On the lower end of the screw 13 there is secured a star shaped cutting member 17 fitting substantially the lower end of the tubular member 12. The lower end of the screw also carries scraping members 18. A steam inlet pipe 19 is connected to the casing 1 near the upper end of the space containing the pipes 10, and a steam outlet pipe 20 is connected with said casing preferably near the lower end of said space and on the side of the same opposite said pipe 19. Ribs 21 extend longitudinally of the member 12, and these coöperate with the thread 22 of the screw 13 to cut the material.

In operation the material to be treated is introduced into the machine through the man hole 4 and of course falls upon the plate 11 and substantially fills the chamber above the same, and in some cases descends also to and into the pipes or tubes 10. Upon the rotation of the shaft 14 the material will be fed downwardly by the screw 13 and will work into the space or chamber between the member 6 and the lower ends of the pipes 10. When this space or chamber becomes sufficiently full, the material will begin to be crowded into the lower ends of the pipes 10 and thence upwardly in the same and will emerge from the upper ends of said pipes and come out upon the plate 11. Upon this plate it will work downwardly to the screw 13 again by which it will be again fed downwardly, probably mingled with other and fresh material in said upper chamber. The screw blade 22 and ribs 21 will cut the material, as will also the member 17. This process will continue for a predetermined or desired length of time, the material in this way keeping up a continuous circulation downwardly in the central tubular member 12 and upwardly in the pipes 10. During this circulation the material will be heated by steam circulating through the chamber containing the pipes 10, said steam entering through the pipe 19 and leaving through the pipe 20. At the same time the action of the condenser or other vacuum producing apparatus connected with the pipe 5, produces a vacuum in the upper chamber and this will draw off certain fumes and vapors, and also produce a vacuous condition by which the process or treatment will be greatly facilitated and hastened. Material to be treated may be introduced in various states or conditions. For example, it may be introduced raw, as for example raw apples, and these will be more or less cut up or ground until they are sufficiently reduced to enable them to enter the central member 12 and come under the influence of the screw 13. The apple pulp thus formed will then be subjected to the circulating process previously described, during which it will be heated and vapors drawn off and the apple pulp further reduced by repeated operations of the cutting members. In this way the apples for example may be reduced to a more or less mushy condition, in which condition they are useful and desirable for certain purposes. When the apples are sufficiently reduced the outlet valve 9 may be opened and the material withdrawn through the outlet pipe 8.

This, of course, is merely to illustrate the operation of the apparatus. Other materials may be treated in the same way or differently.

It will be understood that changes and modifications may be made without departing from the spirit of the invention.

What we claim is:

1. The combination of a casing, means within said casing for compressing the material and causing an advance movement of the same, and tubular members for permitting a return movement of said material.

2. The combination of a casing, means within said casing for compressing the material and causing an advance movement of the same, tubular members for permitting a return movement of said material, and means for heating said material.

3. The combination of a casing, means within the casing for bringing about a continuous forward movement of the material being acted upon, one or more return passages through which the material may return to be again acted upon by said feeding means, and means for subjecting said material to the influence of a vacuum.

4. The combination of a casing, means within said casing for causing an advance movement of the material being treated, tubular members for permitting a return movement of said material, and means for subjecting said material to the influence of a vacuum.

5. The combination of a casing, means within the casing for bringing about a continuous forward movement of the material being acted upon, one or more return passages through which the material may return to be again acted upon by said feeding means, means for heating said material, and means for subjecting said material to the influence of a vacuum.

6. The combination of a casing, means within said casing for causing an advance movement of the material being treated, tubular members for permitting a return movement of said material, means for heating said material, and means for subjecting said material to the influence of a vacuum.

7. The combination of a casing, a centrally disposed screw within said casing for causing a forward feeding movement of the material being treated, one or more return passages at the sides of said screw for returning said material, and mechanical means for acting upon said material to reduce the same.

8. The combination of a casing, a centrally disposed screw for inducing a forward movement of the material being treated, one or more return passages at the sides of said screw for returning said material, and a connecting chamber between said feeding means and said return passage or passages whereby said feeding means may force the material into said return passages.

9. The combination of a casing, means for inducing a forward movement of the material being treated, one or more return passages for said material, a connecting chamber between said feeding means and said return passage or passages whereby said feeding means may force the material into said return passages, and means for heating the material while the same is being fed forwardly and also while it is being returned.

10. The combination of a casing, tubular members arranged within said casing, feeding means arranged to feed the material in a direction lengthwise of said tubular members, and a connecting passage between one end of said feeding mechanism and the corresponding ends of said tubular members whereby the material may be fed from said feeding means to and into said tubular members.

11. The combination of a casing, tubular members arranged lengthwise of one another within said casing, a feed screw extending lengthwise of said tubular members and a connecting passage between one end of said feed screw and the corresponding ends of said tubular members.

12. The combination of a casing, tubular members arranged lengthwise of one another within said casing, a feed screw extending lengthwise of said tubular members, a connecting passage between one end of said feed screw and the corresponding ends of said tubular members, and means for acting mechanically upon said material, said means being carried by said feed screw.

13. The combination of a casing, tubular members arranged vertically in the lower portion of said casing, a vertically arranged feed screw, means connecting the upper ends of said tubular members but leaving said ends open to the chamber or space above the same, and means forming a chamber at the lower ends of said tubular members connecting the same with the lower end of said feed screw.

14. The combination of a casing, tubular members arranged vertically in the lower portion of said casing, a vertically arranged feed screw, means connecting the upper ends of said tubular members but leaving said ends open to the chamber or space above the same, means forming a chamber at the lower ends of said tubular members connecting the same with the lower end of said feed screw, and material reducing members connected with said feed screw for acting upon the material within said chamber.

15. The combination of a casing, tubular members arranged vertically in the lower portion of said casing, a vertically arranged feed screw, means connecting the upper ends of said tubular members but leaving said ends open to the chamber or space above the same, means forming a chamber at the lower ends of said tubular members connecting the same with the lower end of said feed screw, and means at the lower end of said feed screw for acting upon said material.

16. The combination of a casing, tubular members arranged vertically in the lower portion of said casing, a vertically arranged feed screw, means connecting the upper ends of said tubular members but leaving said ends open to the chamber or space above the same, means forming a chamber at the lower ends of said tubular members connecting the same with the lower end of said feed screw, material reducing members connected with said feed screw for acting upon the material within said chamber, and means at the lower end of said feed screw for acting upon said material.

17. The combination of a vertically arranged cylindric casing, provided with vertically extending tubular members, a conically shaped plate connecting the upper ends of said tubular members and having its pointed end downwardly, a transverse plate connecting the lower ends of said tubular members, a centrally arranged tubular member containing a vertically arranged feed screw, and a chamber at the lower end of said feed screw for permitting the movement of material from said screw to and into the lower ends of said tubular members.

18. The combination of a vertically arranged cylindric casing, provided with vertically extending tubular members, a conically shaped plate connecting the upper ends of said tubular members and having its pointed end downwardly, a transverse plate connecting the lower ends of said tubular members, a centrally arranged tubular member containing a vertically arranged feed screw, a chamber at the lower end of said feed screw for permitting the movement of material from said screw to and into the lower ends of said tubular members, members 16 carried by the upper end of said feed screw and arranged to rotate with the same substantially in contact with said conical plate, and a member 17 provided with radially extending portions connected with the lower portion of said feed screw.

19. The combination of a vertically arranged cylindric casing, provided with vertically extending tubular members, a conically shaped plate connecting the upper ends of said tubular members and having its pointed end downwardly, a transverse plate connecting the lower ends of said tubular members, a centrally arranged tubular member containing a vertically arranged feed screw, a chamber at the lower end of said feed screw for permitting the movement of material from said screw to and into the lower ends of said tubular members, members 16 carried by the upper end of said feed screw and arranged to rotate with the same substantially in contact with said conical plate, a member 17 provided with radially extending portions connected with the lower portion of said feed screw, and a member 18 also connected with the lower end of said screw.

In witness whereof we hereunto subscribe our names this 28th day of September, A. D. 1916.

JULIAN G. GOODHUE.
PHILIP B. SADTLER.

Witnesses:
J. LYDA JONES,
HAZEL A. JONES.